(12) United States Patent
Lo

(10) Patent No.: US 6,785,475 B2
(45) Date of Patent: Aug. 31, 2004

(54) OPTOELECTRONIC TRANSCEIVER

(75) Inventor: Wei-Zen Lo, Hua-Lien Hsien (TW)

(73) Assignee: Delta Electronics, Inc., Taoyuan Sien (TW)

( * ) Notice: Subject to any disclaimer, the term of this patent is extended or adjusted under 35 U.S.C. 154(b) by 567 days.

(21) Appl. No.: 09/942,853

(22) Filed: Aug. 29, 2001

(65) Prior Publication Data
US 2002/0033980 A1 Mar. 21, 2002

(30) Foreign Application Priority Data
Sep. 15, 2000 (TW) .......................... 89118884 A

(51) Int. Cl.⁷ .............................. H04B 10/00; G02B 6/12
(52) U.S. Cl. .......................... 398/135; 398/117; 385/14
(58) Field of Search .......................... 398/117, 135–139, 398/163, 164; 385/14; 257/80–84, 98–99

(56) References Cited

U.S. PATENT DOCUMENTS 4,912,521 A * 3/1990 Almquist et al. ........... 398/117
5,069,522 A * 12/1991 Block et al. ................ 385/39
6,461,058 B1 * 10/2002 Birch et al. ................ 385/92
6,583,902 B1 * 6/2003 Yuen .......................... 398/135

* cited by examiner

Primary Examiner—Jason Chan
Assistant Examiner—Dzung Tran
(74) Attorney, Agent, or Firm—Thomas, Kayden, Horstemeyer & Risley

(57) ABSTRACT

The present invention discloses an optoelectronic transceiver, comprising a first PCB, a transmitting device, a receiving device and a housing. The transmitting device includes a laser diode, and the receiving device includes a photo diode. The laser diode and photo diode are encapsulated by a sleeve, respectively. For the laser diode, a first cambered surface of the sleeve aligns a laser beam such that it goes straight forward along the sleeve, and the second cambered surface of the sleeve focuses the laser beam. The housing covers the first PCB, the transmitting device and the receiving device.

18 Claims, 3 Drawing Sheets

OPTOELECTRONIC TRANSCEIVER

BACKGROUND OF THE INVENTION

1. Field of the Invention

The present invention relates to an optoelectronic transceiver, and more particularly to an optoelectronic transceiver without "To-can" or glass lenses.

2. Description of the Prior Art

An optoelectronic transceiver is used to transform an optical signal coming from an optical fiber connector to an electrical signal, or transform an electrical signal to an optical signal. A photo diode in the optoelectronic transceiver transforms the optical signal to the electrical signal and then sends the electrical signal to a processing circuit. A laser diode in the optoelectronic transceiver transforms the electrical signal coming from the processing circuit to the optical signal and then outputs the optical signal.

FIG. 1 shows a conventional optoelectronic transceiver 10. The optoelectronic transceiver 10 includes a front portion and a rear portion. The rear portion is composed of a large PCB (printed circuit board) 20, having a circuit (not shown) for processing the optical signal and the electrical signal, formed on its upper surface. There are 9 pins protruding from the lower surface of the large PCB 20. The front portion includes a laser diode 30 and a photo diode (not shown). The laser diode 30 is encapsulated into a "To-package". As shown in the enlarged portion of FIG. 1, a laser diode chip 33 mounted on a small PCB 31 is covered with a metallic cup-shaped "To-can" 37. A transparent window formed on the front terminal corresponds to the optical output path of the laser chip. A ball lens 38 or a glass lens is formed on the transparent window. Via the ball lens 38, the laser beam emitted by the laser diode chip 33 can be focused and projected. The laser diode 30 is inserted into a sleeve 35 so that the laser diode 30 can be aligned with a ferrule 61 of an optical fiber connector 60 connecting to an optical fiber 70. Since the configuration of the photo diode is similar to the laser diode, the detailed description is omitted.

Still referring to FIG. 1, in the laser diode 30, the laser diode chip 33 is electrically coupled to the circuit formed on the large PCB 20 via several external pins 39. The external pins 39 of the laser diode 30 are inserted into the through-holes of the large PCB 20 to form an electrical connection. It should be noted that in the conventional optoelectronic transceiver 10, parasitical capacitors and inductors lead to poor performance, such as poor transmission rate. The parasitical capacitors are mainly caused by the metallic cup-shaped "To-can" 37 and the large PCB 20. The parasitical inductors mainly results from the external pins 39 because the conducting external pins 39 can be viewed as a inductor during high frequency, such as GHz.

The disadvantages of the conventional optoelectronic transceiver 10 further include the high manufacturing cost of the ball lens 38 and the fact that the configuration of the transceiver is unsuitable for small form factor (SFF). The reason a conventional transceiver is unsuitable for SFF is that the volume of the metallic cup-shaped "To-can" 37 is too large compared to that of the laser diode chip 33. After being inserted into the sleeve 35, the volume is further increased. Accordingly, there is a strongly felt need for a novel optoelectronic transceiver for improving the transmission rate and reducing the manufacturing cost.

SUMMARY OF THE INVENTION

The present invention discloses an optoelectronic transceiver comprising a first PCB (printed circuit board), a transmitting device and a receiving device. The first PCB includes a first upper surface, a first lower surface and a plurality of pins. A circuit is formed on the first upper surface. The pins protrude from the first lower surface. The transmitting device is formed on the first PCB.

The transmitting device further includes a second PCB, a laser diode chip and a first sleeve. The second PCB further has a second upper surface and a second lower surface having leads formed thereon. The second PCB is electrically coupled to the first PCB. In an embodiment of the present invention, the laser diode chip is formed on the second upper surface of the second PCB. The semiconductor laser diode chip is electrically coupled to leads on the second lower surface. The laser diode chip responds to an electrical signal coming from the circuit on the first PCB to output an optical signal, such as a laser beam.

The first sleeve, transparent or opaque, has a first cambered surface and a second cambered surface formed at opposite terminals. The first sleeve covers the semiconductor laser diode chip and the second upper surface of the second PCB. The first cambered surface is aligned with the optical output path such that the laser beam emitted from the semiconductor laser diode chip can go straight forward along the first sleeve. That is, the first cambered surface serves as a lens. Additionally, the second cambered surface is aligned with the ferrule so as to focus the laser beam on the ferrule interposed between the first sleeve and the optical fiber connector. That is, the second cambered surface is used to focus.

A receiving device is also formed on the first PCB. The receiving device includes a third PCB, a photo diode chip and a second sleeve. The third PCB has a third upper surface and a third lower surface having leads formed thereon. The third PCB is electrically coupled to the first PCB. In an embodiment of the present invention, the photo diode chip is formed on the third upper surface of the third PCB. The photo diode chip is electrically coupled to leads on the third lower surface. The photo diode chip responds to an optical signal to send an electrical signal to the circuit on the first PCB for processing. The second cambered surface aligns the optical signal coming from the optical fiber to the second sleeve, and the first cambered surface focuses the optical signal on the photo diode chip. The optoelectronic transceiver in the present invention further includes a housing for covering the first PCB, the transmitting device and the receiving device.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DESCRIPTION OF THE PREFERRED EMBODIMENTS

Figure 1:
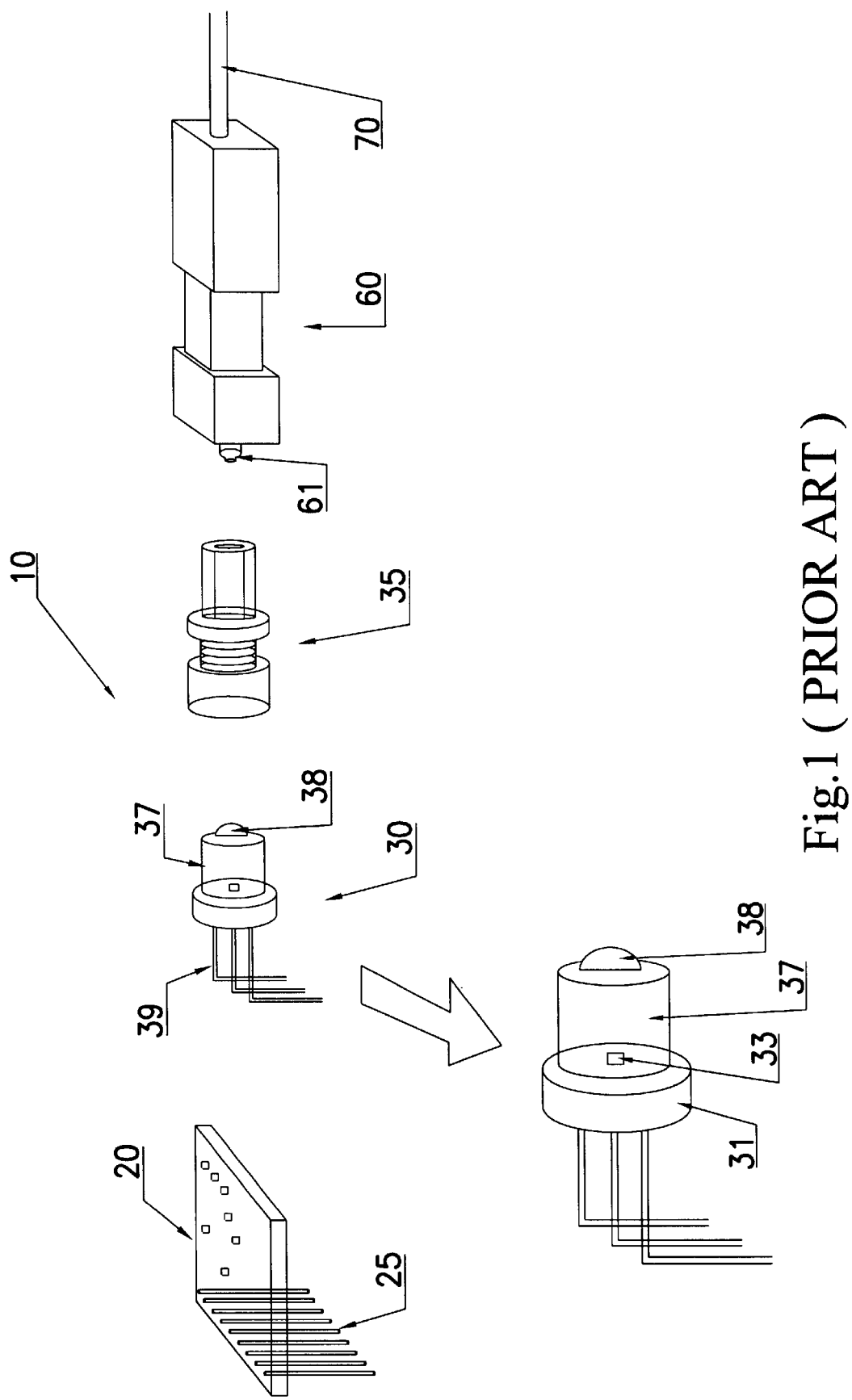
FIG. 1 depicting a conventional optoelectronic transceiver.
Figure 2:
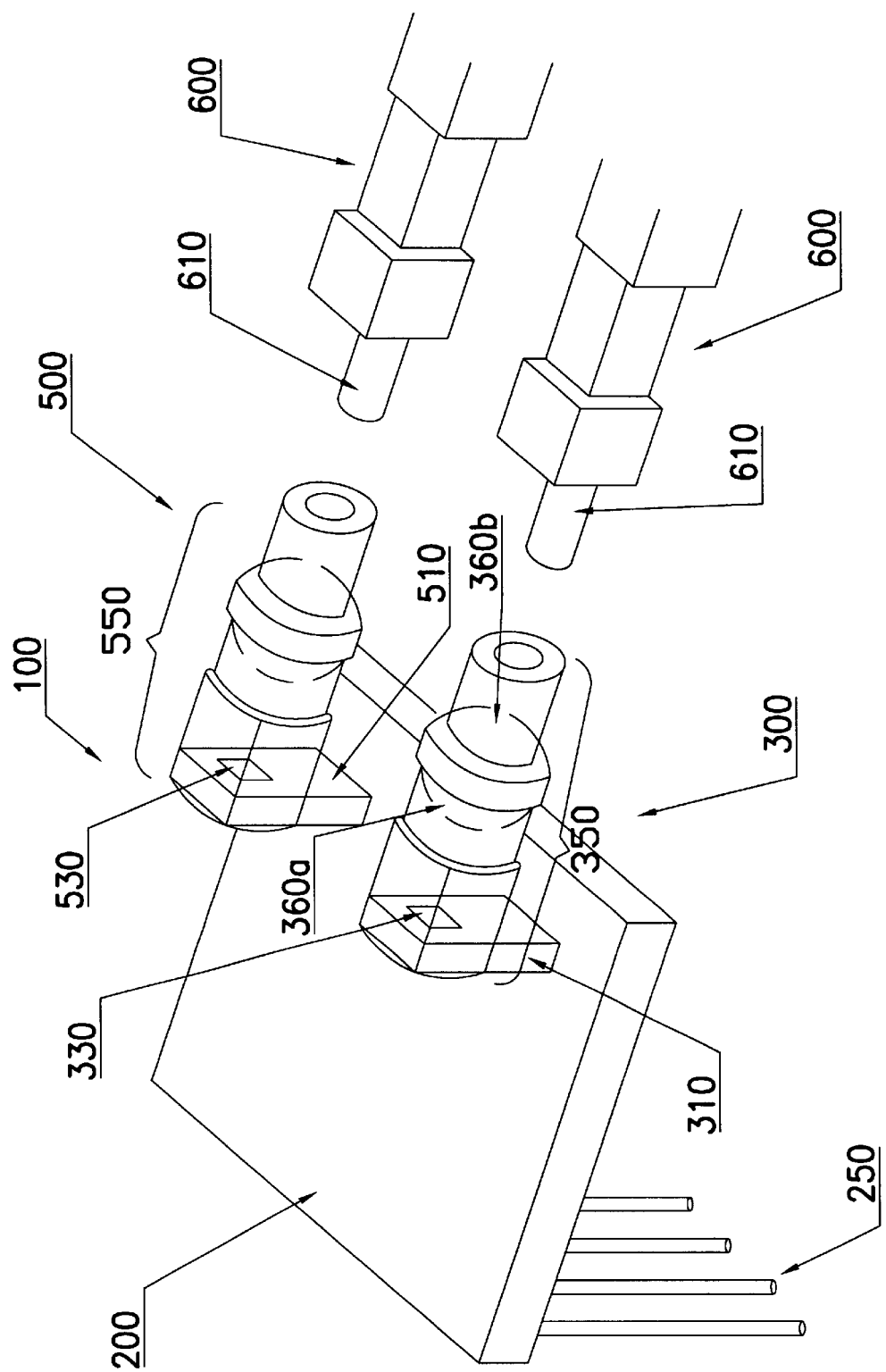
FIG. 2 depicting a schematic diagram of a optoelectronic transceiver according to the present invention.

The present invention discloses an optoelectronic transceiver 100, as shown in FIG. 2, comprising a first PCB (printed circuit board) 200, a transmitting device 300, and a receiving device 500. The first PCB 200 includes a first upper surface, a first lower surface and a plurality of pins 250. A circuit (not shown) is formed on the first upper surface. The pins 250 protrude from the first lower surface.

Still referring to FIG. 2, the transmitting device 300 is formed on the first PCB 200. The transmitting device 300 further includes a second PCB 310, a laser diode chip 330, such as a semiconductor laser diode chip, and a first sleeve 350. The second PCB 310 further has a second upper surface and a second lower surface having leads, such as pads, formed thereon. The second PCB 310 is electrically coupled to the first PCB 200, such as via bonding wires. In this embodiment, the semiconductor laser diode chip 330, including a Fabry-Perot laser diode and a vertical cavity surface emitting laser diode, is formed on the second upper surface of the second PCB 310. The semiconductor laser diode chip 330 is electrically coupled to leads on the second lower surface. The semiconductor laser diode chip 330 responds to an electrical signal coming from the circuit on the first PCB 200 to output an optical signal, such as a laser beam.

Figure 3:
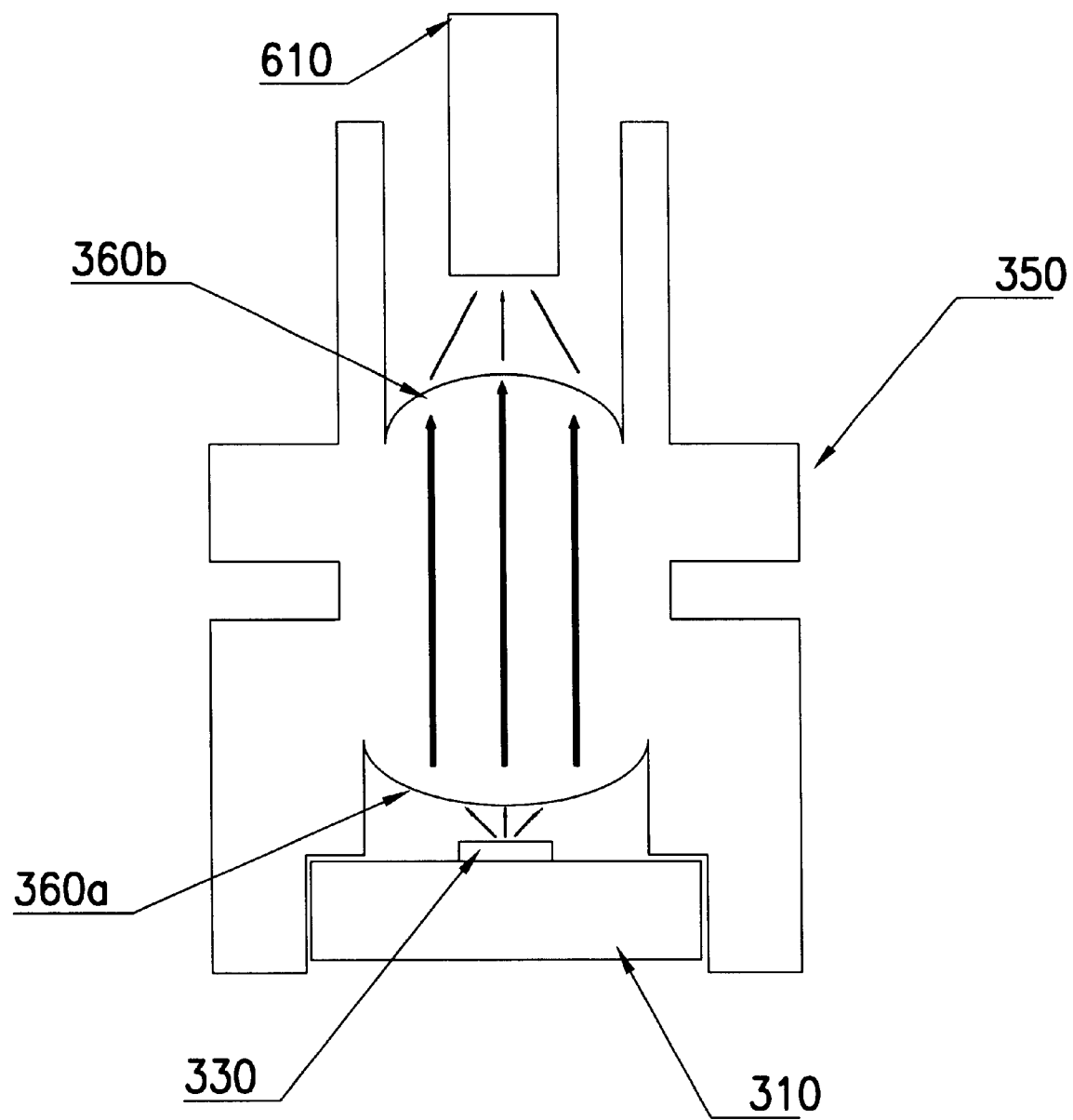
FIG. 3 depicting a top planar cross-sectional view of the sleeve according to the present invention.

Refer to FIG. 2 and FIG. 3, depicting the cross-sectional view of the first sleeve 350 of the present invention. A terminal of the first sleeve 350 is coupled to the ferrule 610, such as a ceramic ferrule, connecting to an optical fiber connector. The first sleeve 350 has a first cambered surface 360a and a second cambered surface 360b formed at opposite terminals. The first sleeve 350 covers the semiconductor laser diode chip 330 and the second upper surface of the second PCB 310. The first cambered surface 360a is aligned with the optical output path such that the laser beam emitted from the semiconductor laser diode chip 330 can go straight forward along the first sleeve 350. That is, the first cambered surface 360a serves as a lens. Additionally, the second cambered surface 360b is aligned with the ferrule 610 so as to focus the laser beam on the ferrule 610 interposed between the first sleeve 350 and the optical fiber connector 600. That is, the second cambered surface 360b is used to focus. Furthermore, the space defined by the first sleeve 350 and the second upper surface of the second PCB 310 is full of inert gas, such as nitrogen, to prevent the semiconductor laser diode chip 330 from being wetted or eroded. The first sleeve 350 is formed integrally with the first cambered surface 360a and the second cambered surface 360b, and may be shaped up by injection molding. The first sleeve 350 may be formed of well-known material such as, PEI or ULTEM®. However, other materials having dielectric strength between about 22 to 33 also can be used. The second sleeve 550 shown in FIG. 2 is similar to the first sleeve 350, so that the description is omitted.

Referring to FIG. 2, the receiving device 500 is also formed on the first PCB 200. The receiving device 500 includes a third PCB 510, a photo diode chip 530 and a second sleeve 550. The third PCB 510 further has a third upper surface and a third lower surface having leads (not shown) formed thereon. The third PCB 510 is electrically coupled to the first PCB 200 by, for example, via bonding wires. In this embodiment, the photo diode chip 530 is formed on the third upper surface of the third PCB 510. The photo diode chip 530 is electrically coupled to leads on the third lower surface. The photo diode chip 530 responds to an optical signal to send an electrical signal to the circuit on the first PCB 200 for processing. The second cambered surface 360b align the optical signal coming from the optical fiber to the second sleeve 550, and the first cambered surface 360a focuses the optical signal on the photo diode chip 530. The optoelectronic transceiver 100 in the present invention further includes a housing (not shown) for covering the first PCB 200, the transmitting device 300 and the receiving device 500.

It should be noted that a significant difference between the present invention and prior art is that the present invention omits the metallic cup-shaped "To-can". The glass lens is also omitted. The metallic cup-shaped "To-can" is replaced with the first sleeve. Additionally, the above-mentioned first cambered surface 360a and the second cambered surface 360b can serve as the glass lens. In this way, the problems resulting from the parasitical capacitor and inductor can be avoided, increasing the transmission rate significantly. In other words, the present invention integrates the functions of the metallic cup-shaped "To-can", the glass lens and the sleeve into a single first sleeve 350. This avoids the parasitical capacitor and inductor. Further, manufacturing steps are reduced, thereby decreasing cost.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An optoelectronic transceiver, comprising:
   a first PCB, including a first upper surface, a first lower surface and a plurality of pins, the first upper surface having a circuit, the pins protruding from the first lower surface;
   a transmitting device, formed on the first PCB, the transmitting device comprising:
   a second PCB;
   a laser diode chip, formed on the second PCB, the laser diode chip being electrically coupled to the circuit, the laser diode chip responding to an electrical signal coming from the circuit to output a laser beam;
   a first sleeve, having a first cambered surface and a second cambered surface formed at opposite terminals, the first sleeve covering the laser diode chip and the second PCB, the first cambered surface aligned with the optical output path such that the laser beam can go straight forward along the first sleeve, the second cambered surface focusing the laser beam;
   a receiving device, formed on the first PCB, the receiving device comprising:
   a third PCB;
   a photo diode chip, formed on the third PCB, the photo diode chip being electrically coupled to the circuit, the photo diode chip responding to an optical signal to output an electrical signal to the circuit;
   a second sleeve, having a third cambered surface and a fourth cambered surface formed at opposite terminals, the second sleeve covering the photo diode chip and the third PCB, the fourth cambered surface aligned with an optical input path of the photo diode chip, the fourth cambered surface aligning an optical signal to the second sleeve, and the third cambered surface focusing the optical signal on the photo diode chip; and
   a housing, covering the first PCB, the transmitting device and the receiving device.

2. The optoelectronic transceiver according to claim 1, wherein the laser diode chip comprises a semiconductor laser diode chip.

3. The optoelectronic transceiver according to claim 1, wherein the laser diode chip comprises a Fabry-Perot laser diode and a vertical cavity surface emitting laser diode.

4. The optoelectronic transceiver according to claim 1, wherein the second cambered surface of the first sleeve and the fourth cambered surface of the second sleeve are aligned with ferrules connecting to a optical fiber connector.

5. The optoelectronic transceiver according to claim 1, wherein a space defined by the first sleeve and the second PCB is full of inert gas.

6. The optoelectronic transceiver according to claim 1, wherein the optical signal comes from an optical fiber.

7. The optoelectronic transceiver according to claim 1, wherein the first sleeve and the second sleeve are transparent or opaque.

8. The optoelectronic transceiver according to claim 1, wherein the first sleeve and the second sleeve are made of material having dielectric strength between about 22 to 33.

9. An optoelectronic transceiver, comprising:
   a first PCB, having a circuit;
   a transmitting device, formed on the first PCB, the transmitting device comprising:
      a second PCB, having a first upper surface and a first lower surface, the first lower surface having leads, the second PCB being electrically coupled to the first PCB;
      a laser diode chip, formed on the first upper surface, the laser diode chip being electrically coupled to the leads, the laser diode chip responding to an electrical signal coming from the circuit to output a laser beam;
      a first sleeve, having a first cambered surface and a second cambered surface formed at opposite terminals, the first sleeve covering the laser diode chip and the second PCB, the first cambered surface aligned with an optical output path such that the laser beam can go straight forward along the first sleeve, the second cambered surface focusing the laser beam;
   a receiving device, formed on the first PCB, the receiving device further comprising:
      a third PCB, having a second upper surface and a second lower surface, the second lower surface having leads, the third PCB being electrically coupled to the first PCB;
      a photo diode chip, formed on the third PCB, the photo diode chip being electrically coupled to the leads, the photo diode chip responding to an optical signal to output an electrical signal to the circuit; and
      a second sleeve, having a third cambered surface and a fourth cambered surface formed at opposite terminals, the second sleeve covering the photo diode chip and the third PCB, the fourth cambered surface aligned with an optical input path of the photo diode chip, the fourth cambered surface aligning an optical signal to the second sleeve, and the third cambered surface focusing the optical signal on the photo diode chip.

10. The optoelectronic transceiver according to claim 9, further comprising a housing for covering the first PCB, the transmitting device and the receiving device.

11. The optoelectronic transceiver according to claim 9, wherein the first PCB has a plurality of protruding pins.

12. The optoelectronic transceiver according to claim 9, wherein the laser diode chip comprises a semiconductor laser diode chip.

13. The optoelectronic transceiver according to claim 9, wherein the laser diode chip comprises a Fabry-Perot laser diode and a vertical cavity surface emitting laser diode.

14. The optoelectronic transceiver according to claim 9, wherein the second cambered surface of the first sleeve and the fourth cambered surface of the second sleeve are aligned with ferrules connecting to a optical fiber connector.

15. The optoelectronic transceiver according to claim 9, wherein a space defined by the first sleeve and the second PCB is full of inert gas.

16. The optoelectronic transceiver according to claim 9, wherein the optical signal comes from an optical fiber.

17. The optoelectronic transceiver according to claim 9, wherein the first sleeve and the second sleeve are transparent or opaque.

18. The optoelectronic transceiver according to claim 9, wherein the first sleeve and the second sleeve are made of material having dielectric strength between about 22 to 33.

* * * * *